United States Patent [19]

Stewen et al.

[11] Patent Number: 5,238,252
[45] Date of Patent: Aug. 24, 1993

[54] SHUT-OFF FITTINGS WITH A SEALING DEVICE

[75] Inventors: Wilhelm Stewen, Oberhausen; Norbert Holken, Datteln; Klaus Stefaniak, Olefen, all of Fed. Rep. of Germany

[73] Assignee: Eisenwerk Heinrich Schilling GmbH & Co., Bielefeld, Fed. Rep. of Germany

[21] Appl. No.: 982,426

[22] PCT Filed: Jan. 17, 1991

[86] PCT No.: PCT/EP91/00074
§ 371 Date: Sep. 18, 1991
§ 102(e) Date: Sep. 18, 1991

[87] PCT Pub. No.: WO91/10855
PCT Pub. Date: Jul. 25, 1991

Related U.S. Application Data

[63] Continuation of Ser. No. 761,936, Sep. 18, 1991, abandoned.

[30] Foreign Application Priority Data

Jan. 18, 1990 [DE] Fed. Rep. of Germany ....... 4001233

[51] Int. Cl.⁵ .............................. F16J 15/26
[52] U.S. Cl. .................. 277/60; 277/115; 277/170; 251/214; 251/330
[58] Field of Search ............... 277/64, 66, 102, 106, 277/110, 112, 115, 123, 120, 60; 251/214, 330

[56] References Cited

U.S. PATENT DOCUMENTS

| 317,962 | 5/1885 | Ballantine | 277/115 |
|---|---|---|---|
| 1,582,786 | 7/1925 | Rhodes | 277/60 |
| 2,780,233 | 2/1957 | Volpin . | |
| 2,830,787 | 4/1958 | Dale et al. | 251/214 |
| 2,876,987 | 3/1959 | Renfro | 251/214 |
| 3,096,070 | 7/1963 | Wolfensperger | 251/214 |
| 3,192,942 | 7/1965 | Manor et al. | 251/214 X |
| 3,379,405 | 4/1968 | Natho | 251/330 X |
| 3,523,551 | 8/1970 | Schmitt . | |
| 3,537,682 | 11/1970 | Priese | 251/214 |
| 3,991,974 | 11/1976 | Bonafous | 251/214 X |
| 4,289,157 | 9/1981 | McGee | 251/214 X |
| 4,486,002 | 12/1984 | Riess et al. | 251/214 |
| 4,500,092 | 2/1985 | Uomala et al. | 277/112 X |
| 4,553,759 | 11/1985 | Kilmoyer | 251/214 X |
| 4,577,873 | 3/1986 | Baumann | 277/123 X |
| 4,634,099 | 1/1987 | Danko et al. | 251/214 X |
| 4,640,305 | 2/1987 | Johnson | 251/214 X |
| 4,745,944 | 5/1988 | Francart, Jr. | 251/214 X |
| 4,930,748 | 6/1990 | Gonsior | 251/214 X |
| 4,934,657 | 6/1990 | Dodson | 251/214 |

FOREIGN PATENT DOCUMENTS

| 0308390 | 3/1989 | European Pat. Off. . | |
|---|---|---|---|
| 289658 | 4/1914 | Fed. Rep. of Germany | 277/115 |
| 1247103 | 8/1967 | Fed. Rep. of Germany . | |
| 7001220 | 4/1970 | Fed. Rep. of Germany . | |
| 2412698 | 9/1975 | Fed. Rep. of Germany . | |
| 673838 | 1/1930 | France | 277/60 |
| 1246883 | 10/1959 | France | 251/214 |
| 475706 | 11/1952 | Italy | 277/110 |
| 507632 | 12/1954 | Italy | 251/214 |
| 15520 | of 1889 | United Kingdom | 277/115 |
| 702736 | 1/1954 | United Kingdom . | |
| 726795 | 3/1955 | United Kingdom . | |
| 817426 | 7/1959 | United Kingdom . | |

Primary Examiner—William A. Cuchlinski, Jr.
Assistant Examiner—Scott W. Cummings
Attorney, Agent, or Firm—Pollock, Vande Sande & Priddy

[57] ABSTRACT

A shut-off fitting with a sealing device consisting of a packing casing and a packing gland for the actuation element of the valve has the packing casing including bores that hold the sealing elements. The packing has at least one grooved metal ring with an elastic ring seal on the side facing the actuation element and the bore. As a seat for an elastic ring seal the packing gland features an oblique shoulder which descends toward the center, whereby the ring seal bears the pressure conveyed by a ring element and produced by a spring in the longitudinal direction of the axis of the actuation element.

14 Claims, 4 Drawing Sheets

SHUT-OFF FITTINGS WITH A SEALING DEVICE

This application is a continuation of Ser. No. 07/761,936, filed on Sep. 18, 1991 now abandoned.

TECHNICAL FIELD

This invention concerns a shut-off fitting with a sealing device.

BACKGROUND ART

Conventional state of the art uses packing glands as seals for the spindles or arbors of shut-off fittings. As the spindles or arbors turn these seals are subject to high wear, attributable essentially to the dynamic stress of the sealing elements. Other known valve fittings with spindle back seals (conus, labyrinth boxes) are effective only if the valve is opened completely, in which case they constitute an additional static seal. The purpose of this type of seal is in effect to offer the possibility of replacing worn packing glands. Solutions with conventional packing glands do not achieve the sealing quality required under the legal regulations valid in Germany today.

Another known technique is to equip spindle and arbor seals with a bellow-type valve. So far this design has been used only with small nominal diameters (under DN 200). The bellow-type design requires an overall height which is three to four times the diameter of the pipe and thus is unsuitable for many applications, due to a lack of space. In addition, the bellow-type design has the shortcoming that a defective bellow requires the replacement of the entire shut-off fitting.

The shut-off fitting described in the U.S. Pat. No. 2,780,233 also has the disadvantage that it has a relatively large overall height. Neither does the use of a single packing gland, which in this design serves as the main seal in different operating positions, meet the legal requirements that apply in Germany. In particular, compliance with the corresponding sealing requirements cannot be guaranteed during the required replacement of packing glands, because this design lacks a back sealing element. Finally, the design of the solution proposed in U.S. Pat. No. 2,780,233 is relatively complex. This makes it necessary to disassemble and reassemble a number of parts of the housing when the packing gland is changed.

SUMMARY OF THE INVENTION

Departing from the aforementioned state of the art the purpose of this invention is to create a shut-off fitting, i.e. a sealing device for a shut-off fitting which does not have the disadvantages of conventional solutions and is characterized by a high quality seal. In particular, this fitting is designed to meet the critical requirements of German legal specifications known under the short term "TA-Luft" (TA-Air) dated Feb. 27, 1986. It should allow the manufacture of a particularly tight sealing shut-off fitting with small over height which is suitable for pipes with a large nominal diameter (i.e. over DN 200) at economical cost.

This is achieved by a present invention design of the shut-off fitting which features a sealing area which, due to the greater interior diameter, is not subject to wear as the spindle or arbor is turned. In this design the sealing elements are not subject to pressure until briefly before the closing process of the fitting is completed.

This allows an improvement of the design of the packing gland area, so it safely meets the appropriate legal requirements, i.e. it reliably establishes a seal toward the external environment.

In the course of their use the majority of large scale fittings remains open or shut for extended periods of time because, unlike control valves, they do not often change their operational status. Consequently, for large scale fittings the intervals between actuation are very long, e.g. up to two years. Through an additional static seal in the sealing area for the closed position of the valve as well as for an intermediary position this invention accounts for such modes of operation, which for more than 99% are static. This additional seal is not subject to dynamic stress when the fitting is actuated and consequently experiences practically no wear.

DETAILED DESCRIPTION OF THE FIGURES

Figure 1:
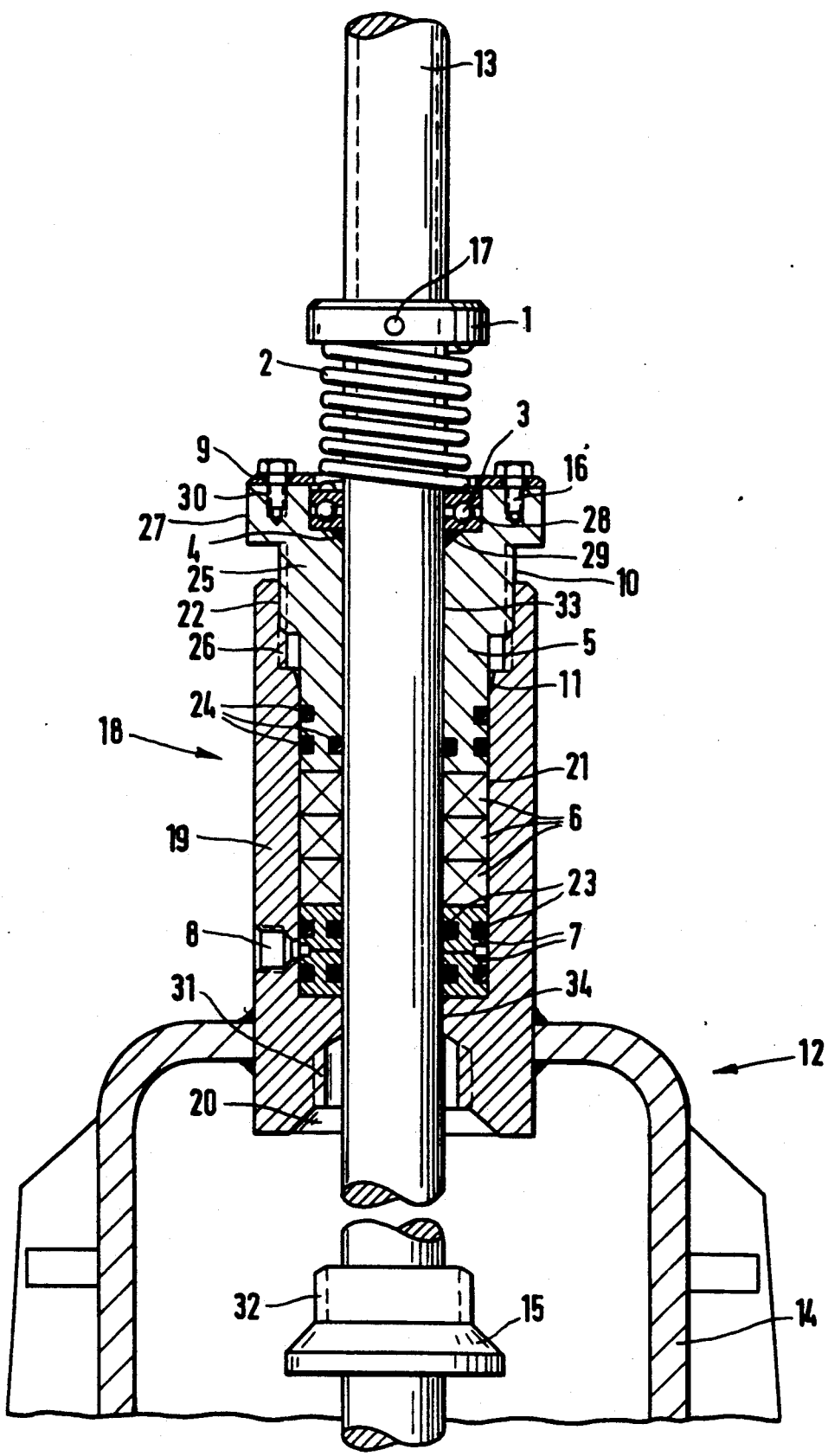
FIG. 1 shows a valve fitting of this invention in a closed position.
Figure 2:
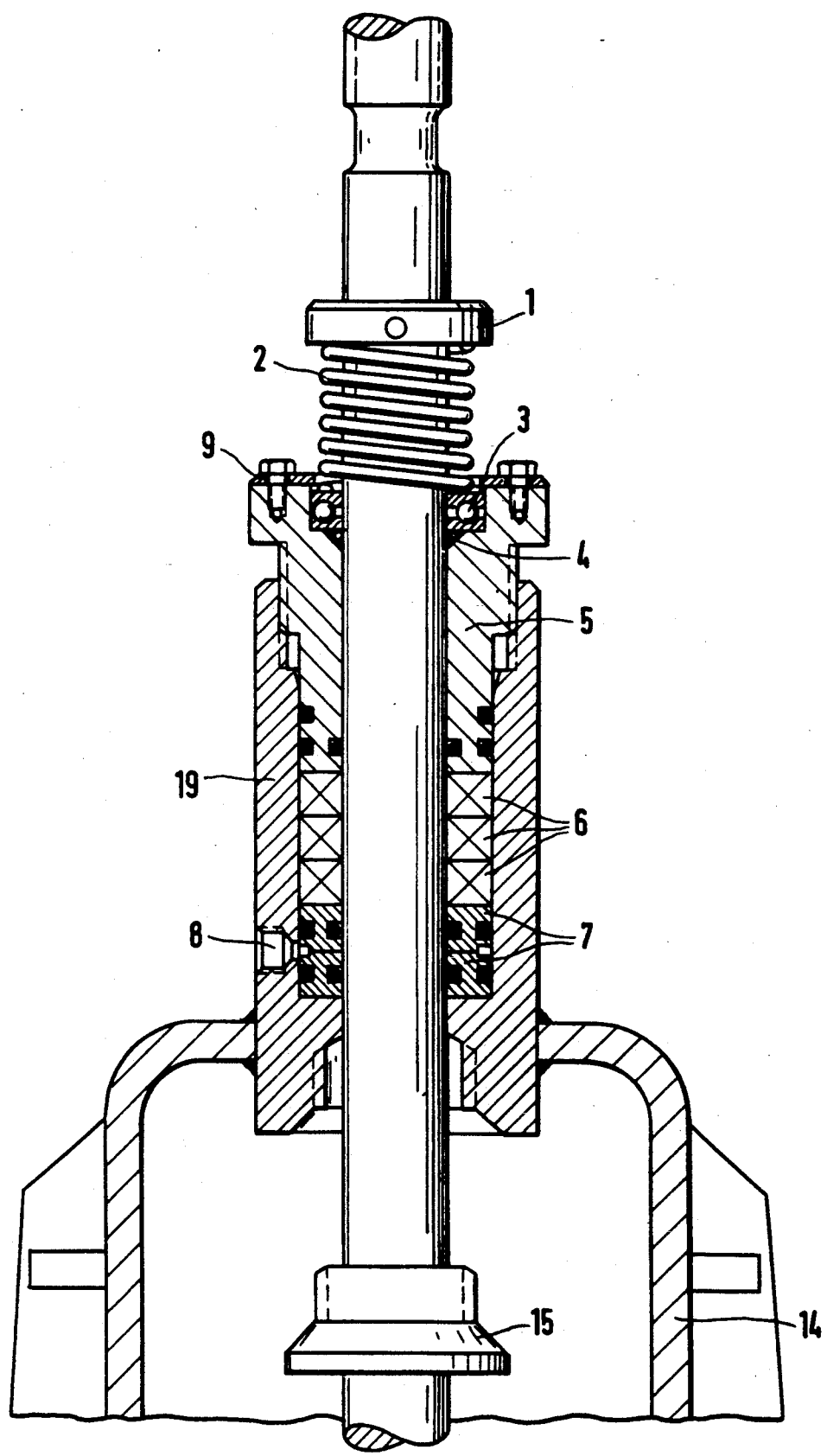
FIG. 2 shows the valve fitting of FIG. 1 in an intermediary position.
Figure 3:
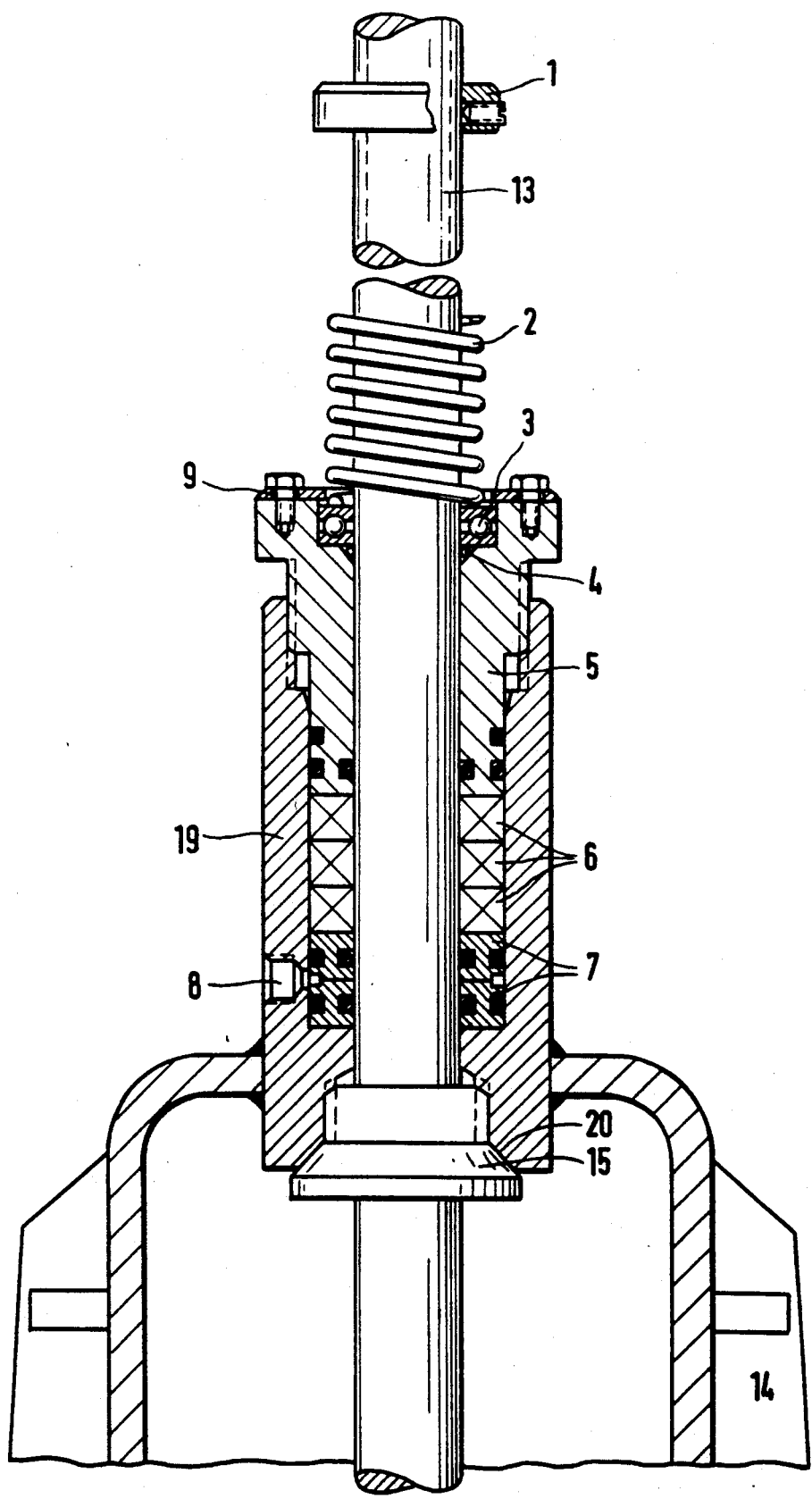
FIG. 3 shows the valve fitting FIG. 1 in an open position.

FIGS. 1 through 3 show a shut-off fitting, depicted as valve fitting 12. The valve fitting features a housing which holds a valve wedge that can be actuated via a spindle 13. The spindle 13 runs in a cylindrical packing casing 19 of a sealing device 18 which is firmly connected to the housing of the fitting.

On the end which is located in the housing of the fitting 14 the packing casing 19 features a valve seat 20 designed to hold a spindle back seal 15 that becomes effective in the opened position of the valve (FIG. 3) and holds a threaded part 32 which can be inserted into threaded bore 31. The cylindrical packing casing 19 contains a guide bore 34 for the spindle 13, a wider bore 21 and an internally threaded 26 boring 22. The wider boring serves as a guide for grooved metal rings 7, for example two, which rest against wider bore 21, i.e. the spindle 13, and via O-rings establish a tight seal. Furthermore, as shown in FIG. 3, the wider bore 21 holds graphite packing rings 6 which rest against the grooved metal rings 7 and can be forced against the packing gland 5, whereby the bore 33 and the valve seat 11 rest against the spindle 13, the wider bore 21, respectively, via O-rings 24.

Packing gland 5 features a first extension part 25 with an external thread 10 that can be screwed into the cylindrical packing casing 19 with internal thread 26 and allows the application of the necessary packing on the graphite packing rings 6. A second extension part 27 of packing gland 5 features an expansion bore 28 which houses an axial bearing 3. Extension part 25 features an oblique shoulder 29 that holds an O-ring 4 which rests against the axial bearing 3.

Axial bearing 3 is held in place by a retainer ring 9 which in this example is fastened with mounting elements 16 which engage in the threaded bore 30 of the second extension part 27.

In the cylindrical packing gland casing 19 a threaded opening 8 in the area of the grooved metal rings 7 is designed to receive the packing (not depicted here).

A spring 2 held in place by a retainer ring 1 that is adjustable in height is placed over the spindle 13. The retainer ring 1 can be secured via a fastening element 17.

The sealing device 18 operates in the following manner:

Valve in Closed Position:

As shown in FIG. 1 the retainer ring 1 is fixed in a manner where in the closed position of the valve it exercises a precisely defined pressure against the O-ring via spring 2. Until then the O-ring does not bear any pressure. The axial bearing 3 compensates for the resulting radial forces and thus reduces wear. Together with this static seal the sealing elements which experience dynamic stress have been improved. When the packing rings 6 are changed the grooved metal rings 7 with the O-rings 23 inserted constitute an additional sealing element and complement the conventional spindle back seal 15. Furthermore, the metal rings 7 assist in conveying the pressure for the graphite packing rings 6. The pressure necessary for the graphite packing rings 6 is established by turning the external thread 10 into the internal thread 26.

Threaded opening 8 is used for connecting a device for forcing the packing out (not depicted here). Such a device prevents damage of the spindle and sealing surfaces which frequently occurs when the packing rings 6 are removed be means of a packing puller (needle). Retainer ring 9 holds O-ring 4, which is subject only to static stress.

Through threaded part 32 located above the spindle back seal 15, which is screwed into threaded bore 31, the spindle 13 can be locked in the open valve position. This allows removal and replacement of entire graphite packing rings 6.

Valve in Intermediary position:

As shown in FIG. 2 and in accordance with the changed position of the valve, the retainer ring 1 is secured higher up on the spindle 13 under these operating conditions. This position is used rather infrequently.

Figure 4:
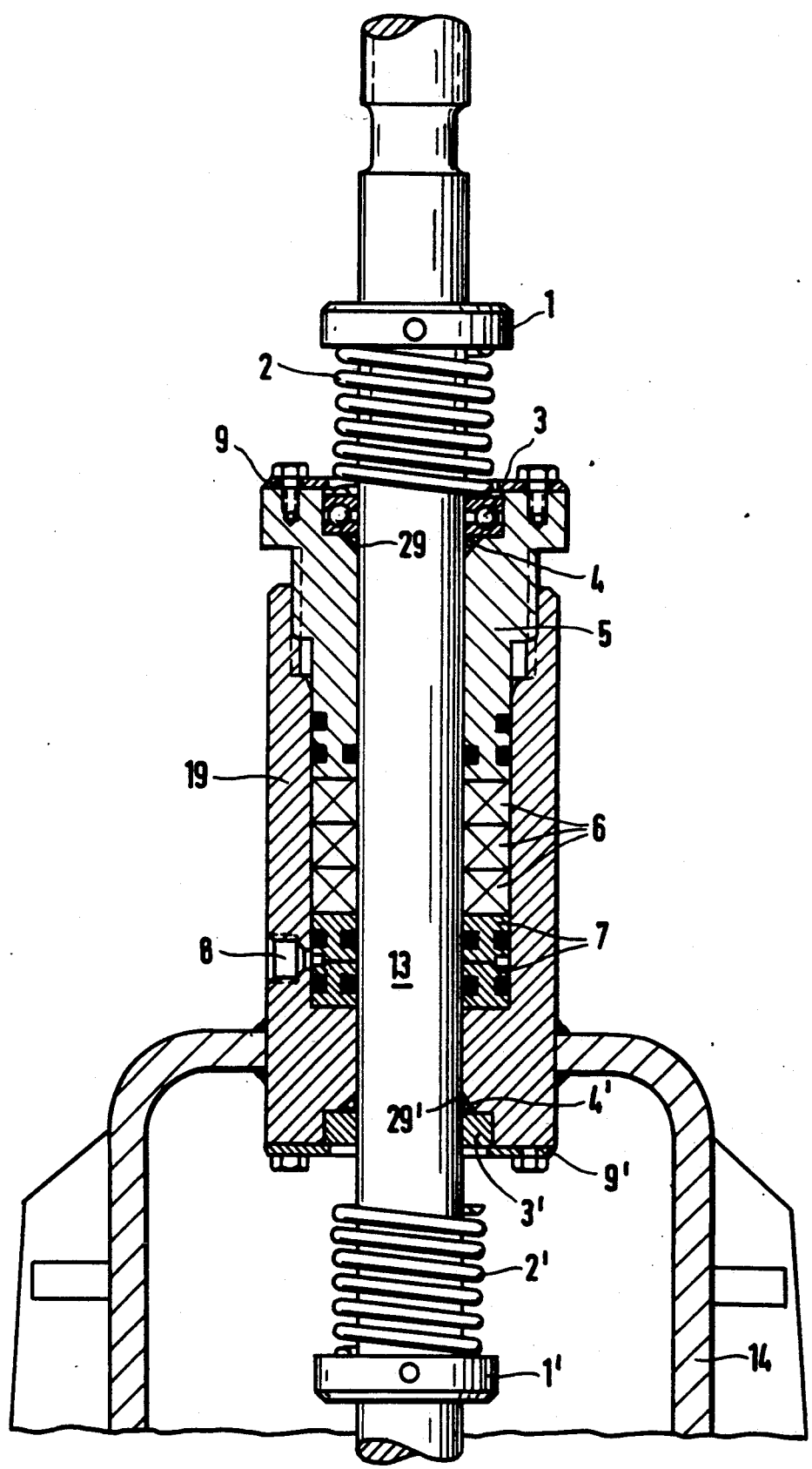
FIG. 4 shows an alternative embodiment in analogy to FIG. 2.

In contrast to the embodiment shown in FIG. 1 through 3, which feature a back seal with a valve seat 20 and a spindle back seal 15, in this case the back seal may be similar to the seal shown in the upper part of the figures. This is shown in FIG. 4. In the case of this alternative embodiment the packing casing 19 includes a cylindrical bore instead of the oblique valve seat 20 with a threaded bore 30, whereby this cylindrical bore holds a ring element 3' which in the open position of spindle 13 bears the force of an inferior spring 2', analogous to spring 2. This additional ring element 3' acting as a back seal forces a ring seal 4', preferably an O-ring, in an oblique groove that ascends toward the center. The ring element 3' is secured by a retainer ring 9'. In its principal design this type of back seal corresponds to seal device on the upper end of the packing gland 5. In the position shown in FIG. 4 the back seal is not active because the figure depicts an intermediary position. The back seal becomes effective only when the valve is changed into the open position.

In the embodiment shown the packing gland is adjusted by turning it in a threaded bore. It is also possible to produce pressure against the seal elements of the packing by means of a packing gland which cannot be turned but moves only in an axial direction and is forced against the packing by a spring acting in the axial direction.

We claim:

1. A shut-off fitting for a valve member having an elongated actuation element comprising:
   an elongated packing casing surrounding said actuation element, said casing having a first bore portion with a first diameter for axially guiding said actuation element, and a second bore portion with a second diameter larger than said first diameter to provide an annular space between said actuation element and said casing;
   a packing seal and a packing gland disposed within said annular space, said packing seal including at least one grooved metal ring and at least one elastic ring seal surrounding said actuation element, said packing gland having an annular oblique shoulder for holding said elastic ring seal in sealing engagement against said actuation element;
   a ring element surrounding said actuation element and bearing against said elastic ring seal;
   a stop element positioned on said actuation element and spaced from said ring element; and,
   spring means extending between said stop element and said ring element for forcing said ring element against said ring seal.

2. A shut-off fitting according to claim 1 further including a back seal device.

3. A shut-off fitting according to claim 1 wherein the stop consists of a ring secured on the actuation element.

4. A shut-off fitting according to claim 2 wherein said back seal device includes an elastic ring seal, a spring and a ring element for bearing pressure of said spring, whereby the ring element is adapted to force said elastic ring seal in an oblique groove that descends toward the center on the side of the valve element which faces the packing casing, said ring seal acting as a seal between the oblique groove of the packing casing and the circumference of the activation element.

5. A shut-off fitting according to claim 1 wherein said ring element is disposed in a bore in said packing gland that envelopes it and said fitting includes a screwed on retaining element which extends over said ring element.

6. A shut-off fitting according to claim 5 wherein the retaining element is a retainer ring.

7. Shut-off fitting according to claim 1 wherein the ring element is an axial bearing.

8. Shut-off fitting according to claim 1 wherein graphite packing rings serve as sealing elements.

9. A shut-off fitting according to claim 1 wherein said packing casing is attachable via a threaded opening to a device for forcing said packing seal out of said casing.

10. Shut-off fitting according to claim 1 wherein the ring seal comprises O-rings.

11. A shut-off fitting according to claim 4 wherein the ring element runs in a bore in the packing gland that envelops it and that it is held there by means of a screwed-on retaining element which extends over it.

12. Shut-off fitting according to claim 6 wherein the ring element is an axial bearing.

13. Shut-off fitting according to claim 7 wherein graphite packing rings serve as sealing elements.

14. A shut-off fitting according to claim 8 wherein said packing casing is attachable via a threaded opening to a device for forcing the packing out of said casing.

* * * * *